(12) United States Patent
Hall et al.

(10) Patent No.: US 7,451,575 B2
(45) Date of Patent: Nov. 18, 2008

(54) FLOOR SYSTEM

(75) Inventors: Georgi Hall, Pittsburg, CA (US); Hoang Nguyen, Tracy, CA (US); Herb Kamphausen, Willits, CA (US)

(73) Assignee: California Expanded Metal Products Company, City of Industry, CA (US)

( * ) Notice: Subject to any disclaimer, the term of this patent is extended or adjusted under 35 U.S.C. 154(b) by 258 days.

(21) Appl. No.: 10/985,342

(22) Filed: Nov. 10, 2004

(65) Prior Publication Data

US 2006/0096181 A1 May 11, 2006

(51) Int. Cl.
*E04B 1/00* (2006.01)

(52) U.S. Cl. ............ 52/289; 52/696; 52/720.1; 52/633; 52/236; 52/656.1; 52/262; 52/236.6; 52/236.9; 52/702; 52/241; 403/397; 403/329; 403/245; 403/232.1; 403/262; 248/201; 248/200.1; 248/300; 248/219.3

(58) Field of Classification Search ............ 52/289, 52/696, 720.1, 633, 236, 656.1, 262, 236.7, 52/236.9, 105, 702, 241, 655; 403/397, DIG. 15, 403/329, 245, 232.1, 262; 248/201, 200.1, 248/300, 219.3; 72/379.2
See application file for complete search history.

(56) References Cited

U.S. PATENT DOCUMENTS

| 2,235,761 | A | * | 3/1941 | Goldsmith ............ 52/292 |
| 3,668,828 | A |   | 6/1972 | Nicholas et al. |
| 3,989,399 | A | * | 11/1976 | Slowbe ............... 403/245 |
| 4,385,476 | A |   | 5/1983 | Slager |
| 4,608,801 | A |   | 9/1986 | Green et al. |
| 4,691,494 | A |   | 9/1987 | Gwynne |
| 4,893,961 | A |   | 1/1990 | O'Sullivan et al. |
| 5,157,883 | A |   | 10/1992 | Meyer |
| 5,189,857 | A |   | 3/1993 | Herren et al. |
| 5,392,565 | A | * | 2/1995 | Rentschler ............ 49/504 |
| 5,442,885 | A | * | 8/1995 | Laven et al. .......... 52/731.3 |
| 5,632,127 | A | * | 5/1997 | Agar et al. ........... 52/481.2 |
| 5,664,392 | A |   | 9/1997 | Mucha |
| 5,671,580 | A |   | 9/1997 | Chou |
| 5,687,538 | A |   | 11/1997 | Frobosilo et al. |
| 5,689,922 | A |   | 11/1997 | Daudet |
| 5,857,306 | A | * | 1/1999 | Pellock ............... 52/643 |
| 5,913,788 | A |   | 6/1999 | Herren |
| 5,927,036 | A |   | 7/1999 | Matthews et al. |
| 5,941,035 | A |   | 8/1999 | Purse |
| 5,950,385 | A |   | 9/1999 | Herren |

(Continued)

FOREIGN PATENT DOCUMENTS

WO  WO 00/31354  6/2000

(Continued)

*Primary Examiner*—Jeanette Chapman
*Assistant Examiner*—Daniel Kenny
(74) *Attorney, Agent, or Firm*—Knobbe, Martens, Olson & Bear, LLP

(57) ABSTRACT

A floor system includes a pair of joist rim assemblies each having a web defining a first surface. The web also includes a mounting portion defining a second surface offset from the first surface. The joist rim may also include a prong defining a slot along with the web. A joist connector bracket is received within the slot and is connectable to the mounting portion of the web. A joist extends between the pair of joist rim assemblies and is connected to the joist connector bracket of each joist rim assembly.

14 Claims, 6 Drawin Sheets

U.S. PATENT DOCUMENTS

| | | |
|---|---|---|
| 5,956,916 A | 9/1999 | Liss |
| 5,983,589 A | 11/1999 | Daudet |
| D423,325 S | 4/2000 | Liss |
| 6,058,668 A | 5/2000 | Herren |
| 6,131,362 A | 10/2000 | Buecker |
| 6,260,318 B1 | 7/2001 | Herren |
| 6,301,854 B1 | 10/2001 | Daudet et al. |
| 6,315,489 B1 * | 11/2001 | Watanabe .................... 403/381 |
| 6,349,512 B1 | 2/2002 | Berkey et al. |
| 6,381,913 B2 | 5/2002 | Herren |
| 6,407,902 B1 | 6/2002 | Patty et al. |
| 6,418,694 B1 | 7/2002 | Daudet et al. |
| 6,430,890 B1 | 8/2002 | Chiwhane et al. |
| D463,575 S | 9/2002 | Daudet et al. |
| D467,007 S | 12/2002 | Daudet et al. |
| 6,609,344 B2 * | 8/2003 | Saldana ........................ 52/696 |
| 6,691,478 B2 | 2/2004 | Daudet et al. |
| 6,691,487 B2 | 2/2004 | Daudet |
| 6,761,005 B1 | 7/2004 | Daudet et al. |
| 6,983,569 B1 * | 1/2006 | Rosenberg .................... 52/241 |
| 2001/0052205 A1 | 12/2001 | Herren |
| 2004/0074178 A1 | 4/2004 | Daudet et al. |
| 2004/0200172 A1 * | 10/2004 | Beck et al. ................ 52/506.03 |
| 2006/0096229 A1 * | 5/2006 | Serpico et al. ................. 52/633 |

FOREIGN PATENT DOCUMENTS

| | | |
|---|---|---|
| WO | WO 00/65169 | 11/2000 |

* cited by examiner

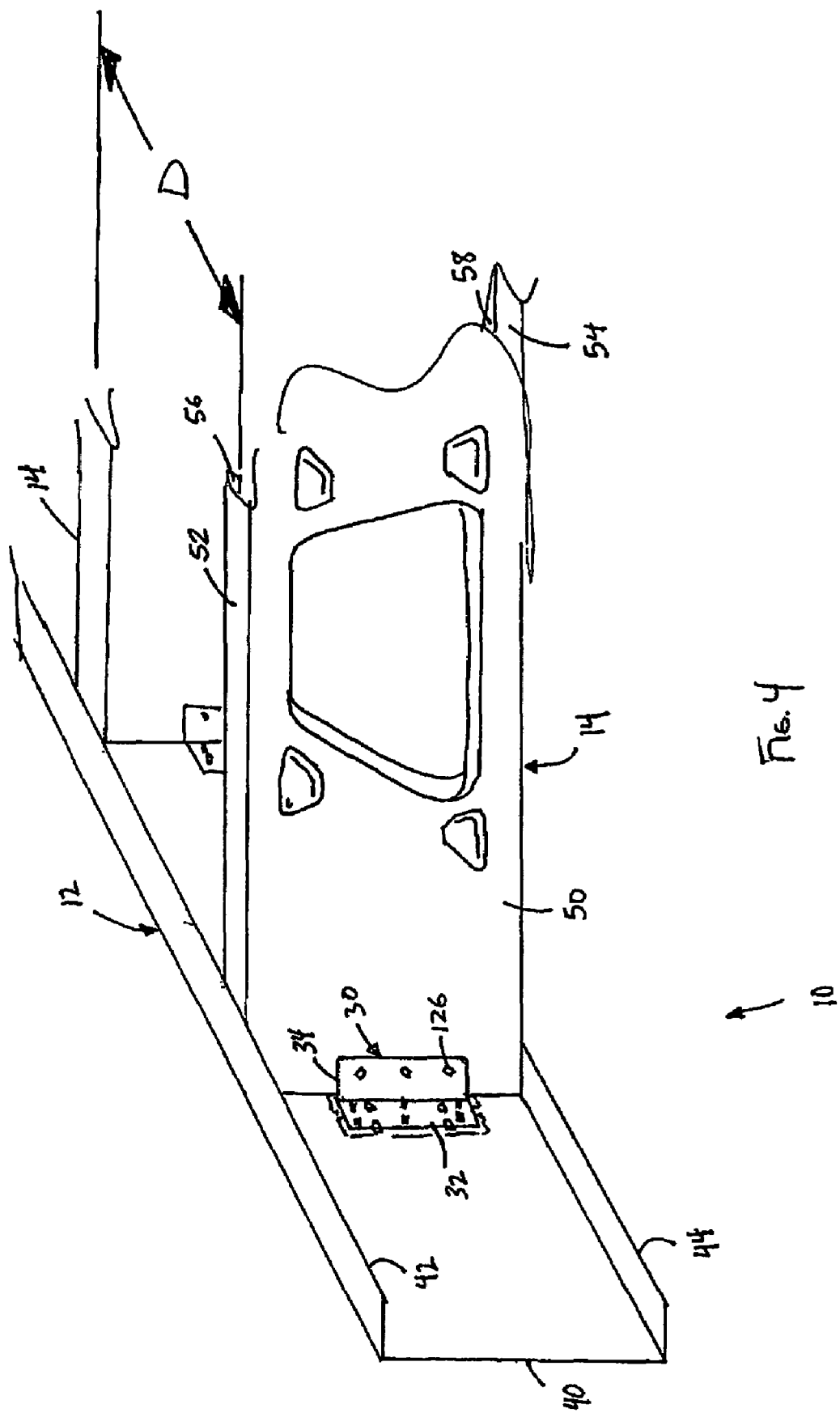

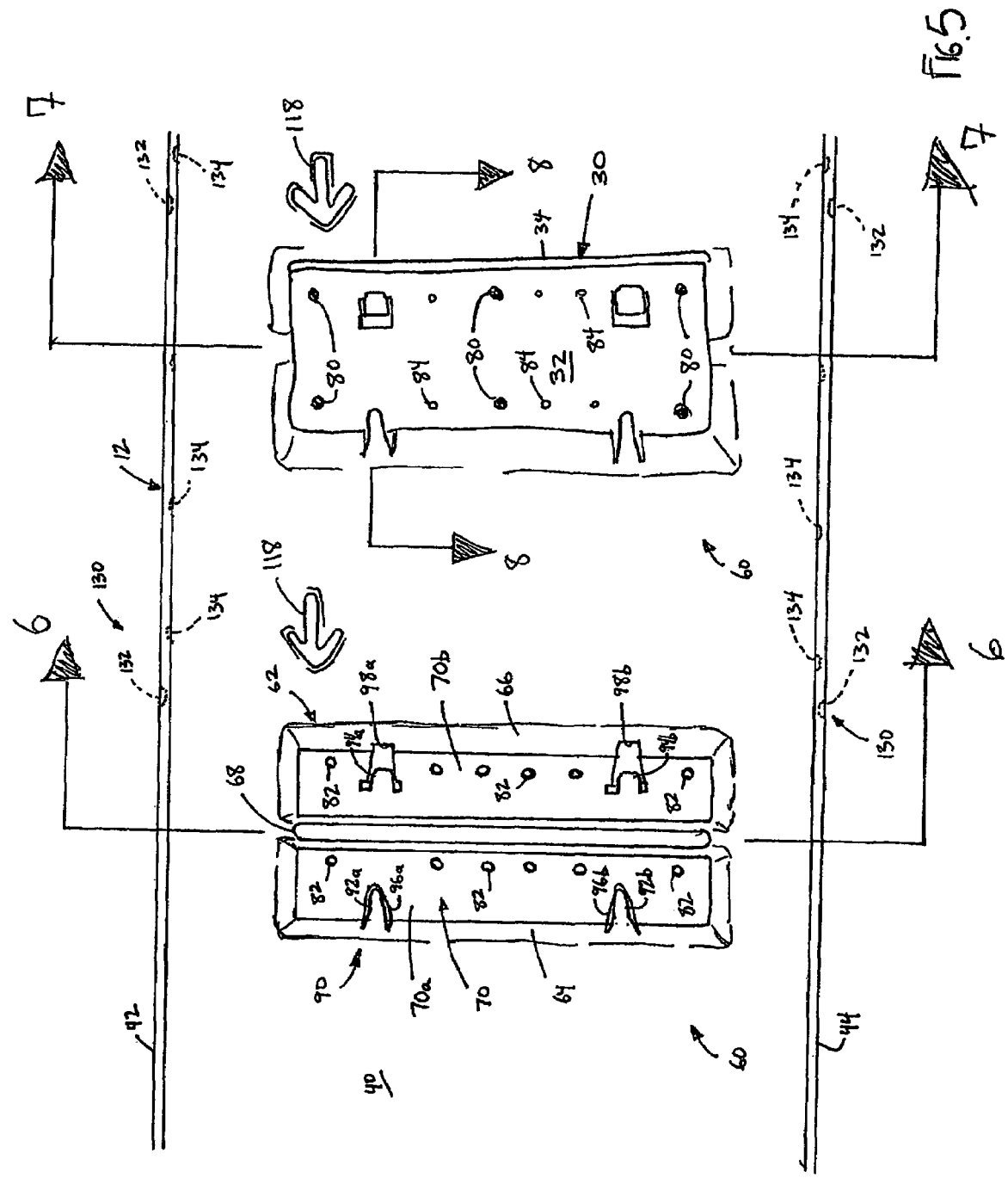

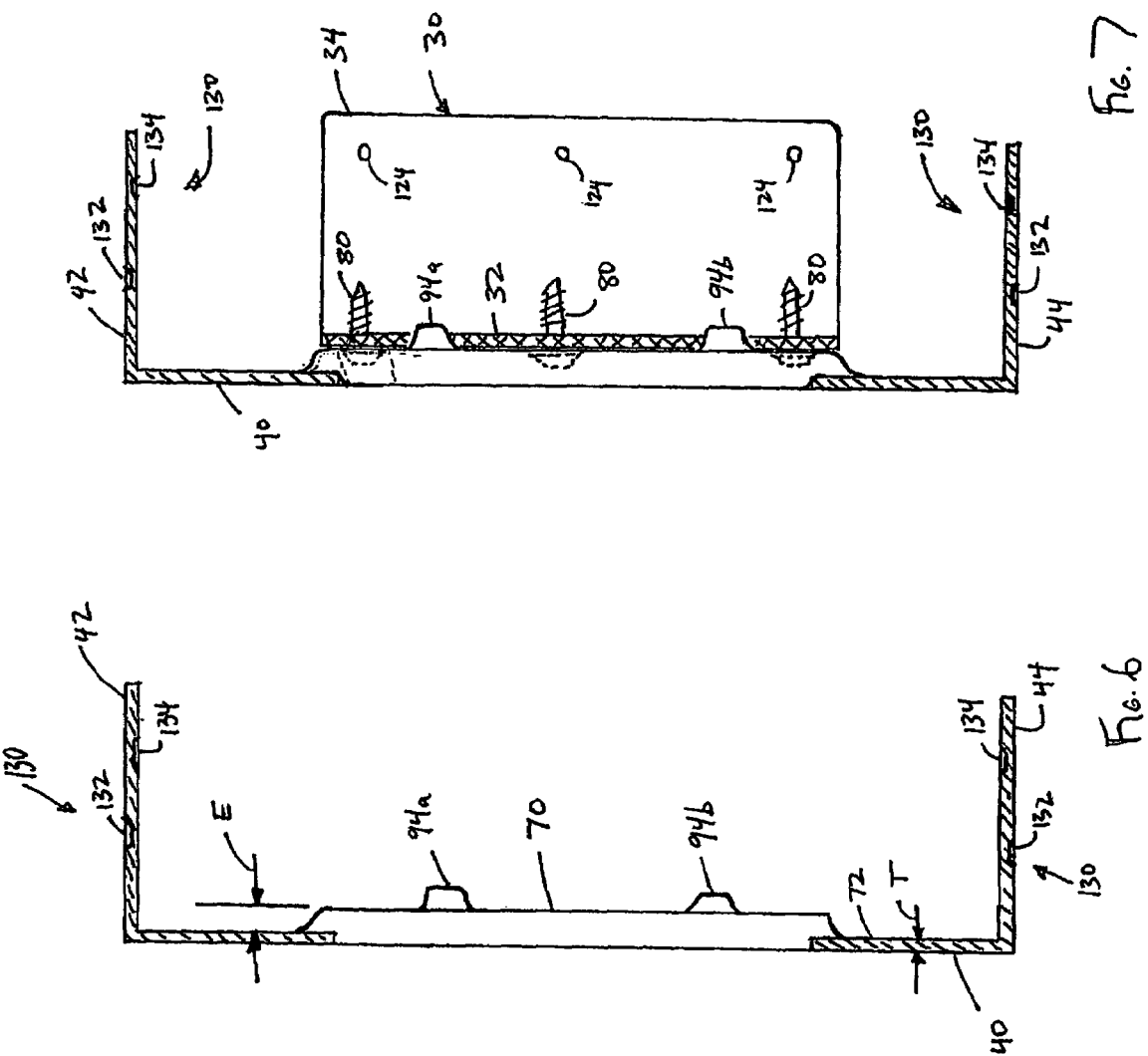

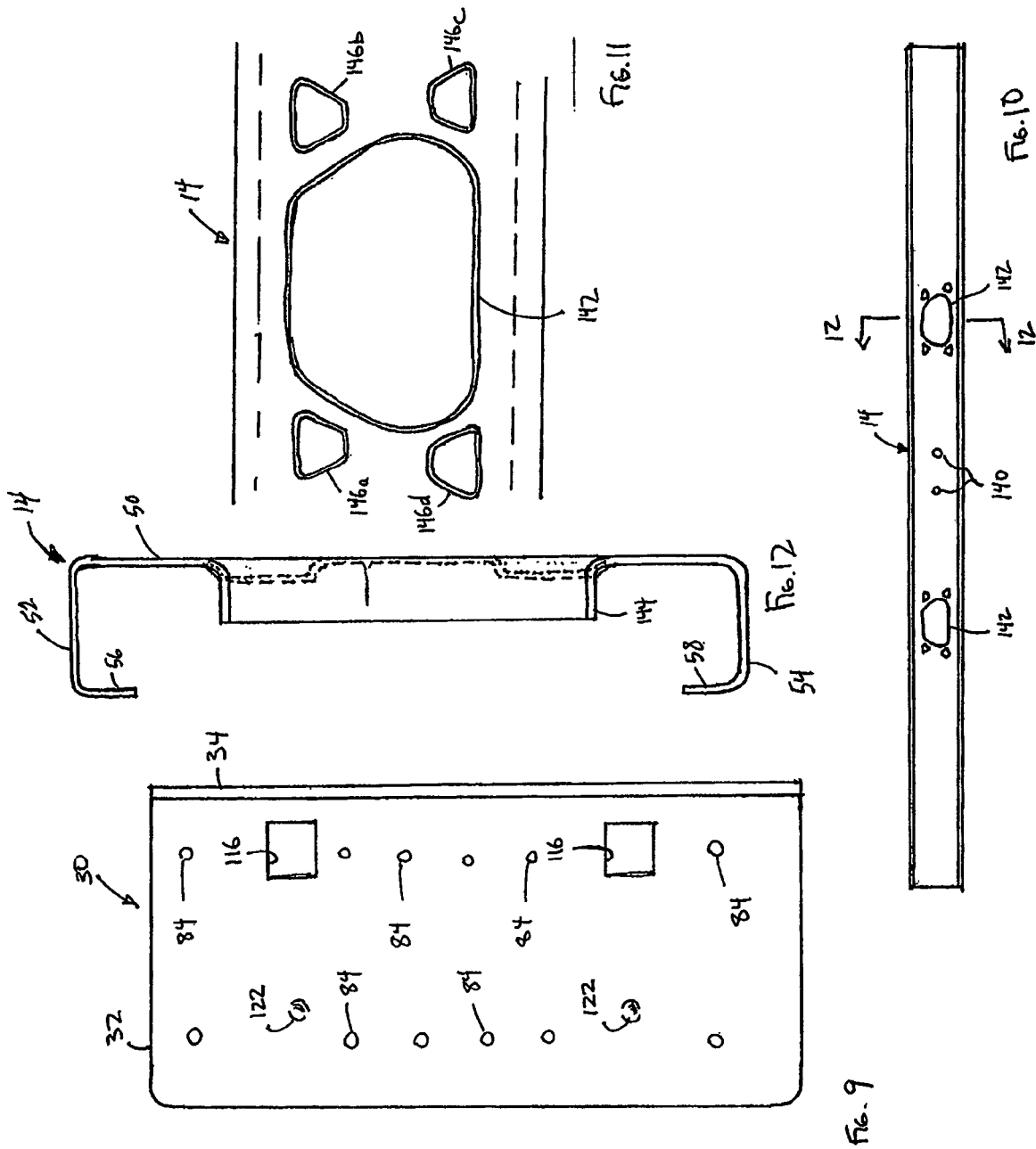

FLOOR SYSTEM

BACKGROUND OF THE INVENTION

1. Field of the Invention

The present invention relates to building construction systems and methods in general and, more specifically, to a floor system and method.

2. Description of the Related Art

Metal building products have become increasingly popular for use in new building construction as an alternative to wood-based building products. For example, metal building products are presently utilized in wall systems and floor systems of residential and commercial buildings. Metal wall systems and floor systems provide many advantages over wood-based products, including a higher strength-to-weight ratio, more consistent quality, and increased useful life.

Despite these advantages, however, existing metal construction systems, and especially floor systems, also suffer from disadvantages. For example, one disadvantage present in existing metal floor systems involves a connection between the joists and the joist rims. In a typical floor system, two opposing joist rims are supported by a support structure, such as a support wall, and the joists extend between the joist rims. The joist rims, thus, interconnect the ends of the joists to create an integral floor structure. In one system, the joist rim is a C-shaped, elongated member having a planar, uninterrupted, inward facing surface. A desired location for each of the joists to be connected to the joist rim is measured and marked on the inward facing surface of the joist rim. A joist connector bracket, or clip angle, is coupled to the joist rim with suitable fasteners, such as screws, for example. Once the clip angles are connected to the joist rim, the ends of the joists may be connected to the clip angle. Although this system provides adequate structural properties, the measuring and connection of the separate clip angles to the joist rim is a time consuming process, which increases the labor costs in assembling the floor system.

An alternative type of metal floor system provides joist rims having a joist connector tab formed from the material of the web of the joist rim. Thus, the joist connector tab is monolithically formed with the joist rim. With such a system, the joists may be connected to the joist rim in the field, without the need to measure and connect the clip angles to the joist rim. Such a system reduces labor costs associated with assembling the floor system.

However, this type of floor system also suffers from several disadvantages. For example, because the joist connector tabs are formed from the web material, a hole is created in the joist rim web as a result of the formation of the connector tab. The hole created weakens the joist rim. The monolithic tab structure also limits the practical dimensions of the joist connector tab because the strength requirements of the joist rim limit the dimensions of the resulting hole in the joist rim web. In addition, the holes in the web of the joist rim remain open, which may result in a reduced ability of the joist rim to abate fire or noise passing through the joist rim. A separate step of covering the holes may reduce or eliminate the cost savings gained by providing the integral joist connector tabs. Furthermore, the size and strength of the joist connector tabs are dependent upon the size and material thickness of the joist rim itself. Accordingly, it may be difficult or impossible to optimize the characteristics of both the joist rim and the joist connector tab.

SUMMARY OF THE INVENTION

Preferred embodiments of the present floor system desirably address at least a portion of the shortcomings of the prior art floor systems. For example, preferred embodiments of the present floor system provide a joist connector bracket that is separate from the joist rim so that each of the joist rim and connector bracket may be optimized for a given floor system. Preferred embodiments of the floor system also provide a structure for quickly positioning joist connector brackets at desired locations along the joist rim and retaining the joist connector brackets in the desired locations. Preferably, the joist connector brackets are further secured to the joist rim by a suitable method, such as one or more mechanical fasteners, for example.

A preferred embodiment is a floor assembly including a first joist rim assembly and a second joist rim assembly. The first joist rim assembly includes a web defining a first surface. A plurality of embossments define a second surface offset from the first surface. At least one prong is associated with each of the plurality of embossments and extends from the web, defining a slot with the second surface. A joist connector bracket is positioned within the slot and at least one fastener secures the joist connector bracket to the joist rim. The second joist rim assembly is preferably the same as the first joist rim assembly and includes a joist rim having a web defining a first surface. A plurality of embossments define a second surface offset from the first surface. At least one prong is associated with each of the plurality of embossments and extends from the web, defining a slot with the second surface. A joist connector bracket is positioned within the slot and at least one fastener for secures the joist connector bracket to the joist rim. The floor assembly also includes a plurality of joists, each of the joists configured to extend between an aligned pair of joist connector brackets of the first and second joist rim assemblies.

Another preferred embodiment is a joist rim assembly including a web defining a first surface. The web also includes a mounting portion defining a second surface offset from the first surface. A bracket is connectable to the mounting portion of the web. The joist rim assembly also includes a means for securing the bracket to the web.

Yet another preferred embodiment is a joist rim including a web. A prong defines a slot with the web and a plurality of preformed fastener holes are formed in the web.

Still another preferred embodiment is a joist rim having a web extending along a length of the joist rim. At least one prong extends from the web and includes a retaining section and a connecting section. The retaining section is spaced from the web a distance sufficient to accommodate a portion of a joist connector bracket between the retaining section and the web. The connecting section of the prong connects the retaining section to the web. A first stop is configured to contact and locate a joist connector bracket at a desired position along the length of the joist rim. A second stop is configured to contact and locate a joist connector bracket at a desired vertical position of the web.

A further preferred embodiment is a floor system including a first joist rim assembly having a web and a plurality of mounting surfaces offset from the web. A plurality of joist connector brackets are configured to be secured to the mounting surfaces. A second joist rim assembly includes a web and a plurality of mounting surfaces offset from the web. A plurality of joist connector brackets are configured to be secured to the mounting surfaces. The floor system also includes a plurality of joists. Each of the joists are configured to extend between an aligned pair of joist connector brackets of the first and second joist rim assemblies.

Yet another preferred embodiment is a joist connector bracket including a first section configured to be securable to a joist rim and a second section configured to be securable to a joist. The first and second sections cooperate to form an L-shape defining a line of intersection between the first and second sections. At least one aperture is defined by the first section and configured to accommodate a prong of an associated joist rim. The prong is configured to support the joist connector bracket on the joist rim.

The present invention also includes a method of assembling a floor system that comprises providing a first joist rim having a web and at least one prong defining a slot with the web and inserting a portion of a first joist connector bracket into the slot of the first joist rim. The method further comprises securing the joist connector bracket to the first joist rim. A second joist rim is provided having a web and at least one prong defining a slot with the web. A portion of a second joist connector bracket is inserted into the slot of the second joist rim and the joist connector bracket is secured to the second joist rim. A joist is connected to the first joist connector bracket at a first end and to the second joist connector bracket at a second end.

Another preferred embodiment is a method of providing a joist rim assembly that comprises positioning a joist connector bracket on a joist rim. The method further comprises providing at least one prong adjacent a web of the joist rim. The prong includes a retaining section spaced from the web and a connecting section that connects the retaining section to the web. The method includes inserting a portion of the joist connector bracket between the retaining section of the prong and the web and moving the connector bracket toward the connecting section of the prong until the connector bracket abuts the connecting section.

BRIEF DESCRIPTION OF THE DRAWINGS

These and other features, aspects and advantages of the present invention are described below with reference to drawings of a preferred embodiment, which is intended to illustrate, but not to limit, the present invention. The drawings contain 12 figures.

FIG. 4 is an enlarged perspective view of a preferred connection between the joist rim and the joists of the floor system of FIG. 1. Furthermore, a preferred embodiment of a joist is illustrated, wherein an opening is provided through the web of the joist and a plurality of embossments are associated with the opening.

FIG. 5 is an elevational view of the joist rim of the floor system of FIG. 1 with the joists removed. FIG. 5 illustrates two joist mounting portions of the joist rim, wherein one mounting portion includes a joist connector bracket, or clip angle, and the other mounting portion has the clip angle removed.

FIG. 6 is a vertical cross-sectional view of the joist rim of FIG. 5, taken along view line 6-6 of FIG. 5.

FIG. 7 is a vertical cross-sectional view of the joist rim of FIG. 5, taken along view line 7-7 of FIG. 5.

FIG. 9 is a side view of a joist connector tab, or clip angle, of FIG. 5.

FIG. 10 is a side, elevational view of a preferred embodiment of a joist of the floor system of FIG. 1.

FIG. 11 is an enlarged view of an opening and embossments associated with the opening of the joist of FIG. 10.

FIG. 12 is a cross-sectional view of the joist of FIG. 10, taken along view line 12-12 of FIG. 10.

DETAILED DESCRIPTION OF THE PREFERRED EMBODIMENT

Figure 3:
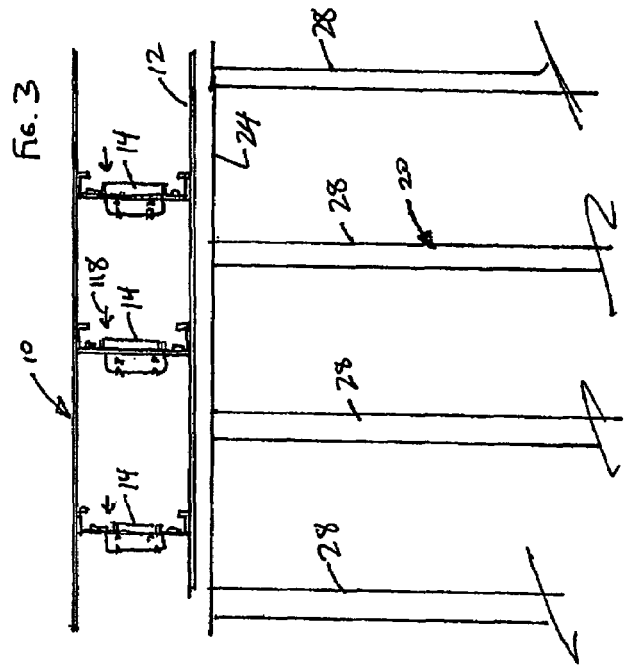
FIG. 3 illustrates an arrangement of the floor system of FIG. 1 wherein the joists are not in vertical alignment with the studs of the first wall.

FIGS. 1-12 illustrate a preferred embodiment of a floor system, generally referred to by the reference numeral 10. The illustrated floor system 10 includes a pair of joist rims 12, or rim tracks and a plurality of joists 14 extending between the joist rims 12. Desirably, the joists 14 are coupled to the joist rims 12 to inhibit relative movement therebetween. If desired, one or more blocking members 16 may extend between, and be connected to, one or more adjacent pairs of joists 14. The blocking members 16 provide support to the joists 14 to inhibit the joists 14 from moving out of their vertical plane in response to a load being applied to the joists 14.

Figure 1:
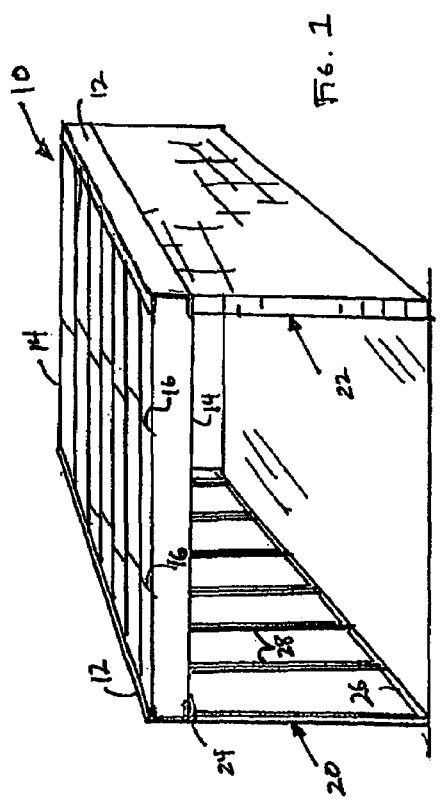
FIG. 1 is a perspective view of a floor system having certain features, aspects and advantages of the present invention. The floor system includes a first joist rim supported by a first wall and a second joist rim supported by a second wall. A plurality of joists extend between the first joist rim and the second joist rim.

In the illustrated arrangement of FIG. 1, the floor system 10 is supported by a first wall 20 and a second wall 22. Desirably, the floor system 10 is supported at a first end by the first wall 20 and at a second end, opposite from the first end, by the second wall 22. Preferably, a first joist rim 12 of the floor system 10 is supported by the first wall 20, and a second joist rim 12 of the floor system 10 is supported by the second wall 22. In the illustrated arrangement, the joist rims 12 are supported on top of the first wall 20 and the second wall 22, respectively, and are coupled thereto as is described in greater detail below. However, in an alternative arrangement, one or both of the joist rims 12 may be supported on the side surfaces of the walls 20, 22. A joist rim 12 coupled to the side of a wall 20, 22 is typically referred to as a ledger beam. In some arrangements, the joist rims 12 of a portion of the floors of a multi-story structure may rest on top of support walls (such as walls 20 and 22), while a portion of the joist rims 12 are mounted to the side surface of a wall in a ledger beam fashion. For example, in an arrangement referred to as balloon framing, a support wall may span several stories of the building, with joist rims 12 resting on top of such a wall and additional joist rims 12 attached to the side of the wall in a ledger beam fashion at appropriate intervals to define individual stories of the structure. Alternatively, the joist rims 12 may be supported by other suitable objects or structures.

In FIG. 1, the first wall 20 is of a framed construction including a header 24, a footer 26, and a plurality of studs 28 extending vertically between the header 24 and the footer 26. The illustrated second wall 22 is a block wall constructed of a plurality of individual blocks spaced apart and secured together by a mortar substance. However, in other arrangements, the walls 20, 22 may be of any alternatively suitable construction.

Figure 2:
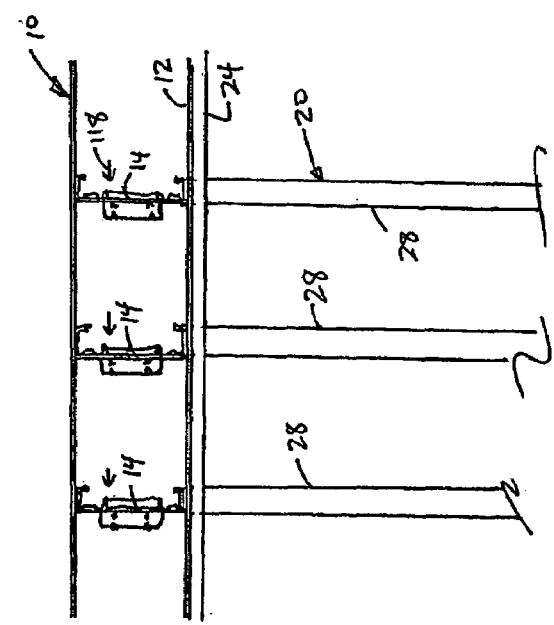
FIG. 2 illustrates an arrangement of the floor system of FIG. 1 wherein the joists of the floor system are vertically aligned with the studs of the first wall.

With reference to FIG. 2, one arrangement of the floor system 10 is illustrated wherein the joists 14 are coupled to the joist rim 12 in a position vertically aligned with the studs 28 of the wall 20. Such an arrangement is referred to as in-line framing. With reference to FIG. 3, an alternative arrangement of the floor system 10 is illustrated, wherein the joists 14 are not aligned with the studs 28 of the wall 20. The floor system 10 may be configured such that the joists 14 are aligned with the studs 28 of the supporting wall 20, if any, or so that the joists 14 are not aligned with the studs 28 of the wall 20. In some arrangements, a portion of the joists 14 may be aligned with studs 28 of the supporting wall 20, while other joists 14 are not in alignment with the studs 28 of the wall 20. If desired, the strength characteristics of the floor system 10 may be altered to suit the desired framing arrangement. For example, the type of material or thickness of material of the joist rim 12 or joists 14 may be altered to permit in-line framing or framing arrangements wherein the joists 14 are not aligned with the studs 28.

With reference to FIG. 4, preferably, each end of each joist 14 is connected to one of the joist rims 12 by a connector bracket, or clip angle 30. Desirably, the clip angle 30 is a separate, or discrete, component from both the joist rim 12 and the joist 14. With such an arrangement, each of the joist rim 12 and clip angle 30 may be individually optimized for the desired characteristics of the floor system 10. For example, the clip angle 30 may function as a web stiffener in addition to, or in the alternative of, functioning to interconnect the joist rim 12 and the joist 14. Advantageously, because the clip angle 30 is discrete from the joist rim 12 and joist 14, the clip angle 30 may be of a different material thickness than the joist rim 12 or may be constructed of a different material to exhibit different strength characteristics or other physical traits than the joist rim 12.

Figure 8:
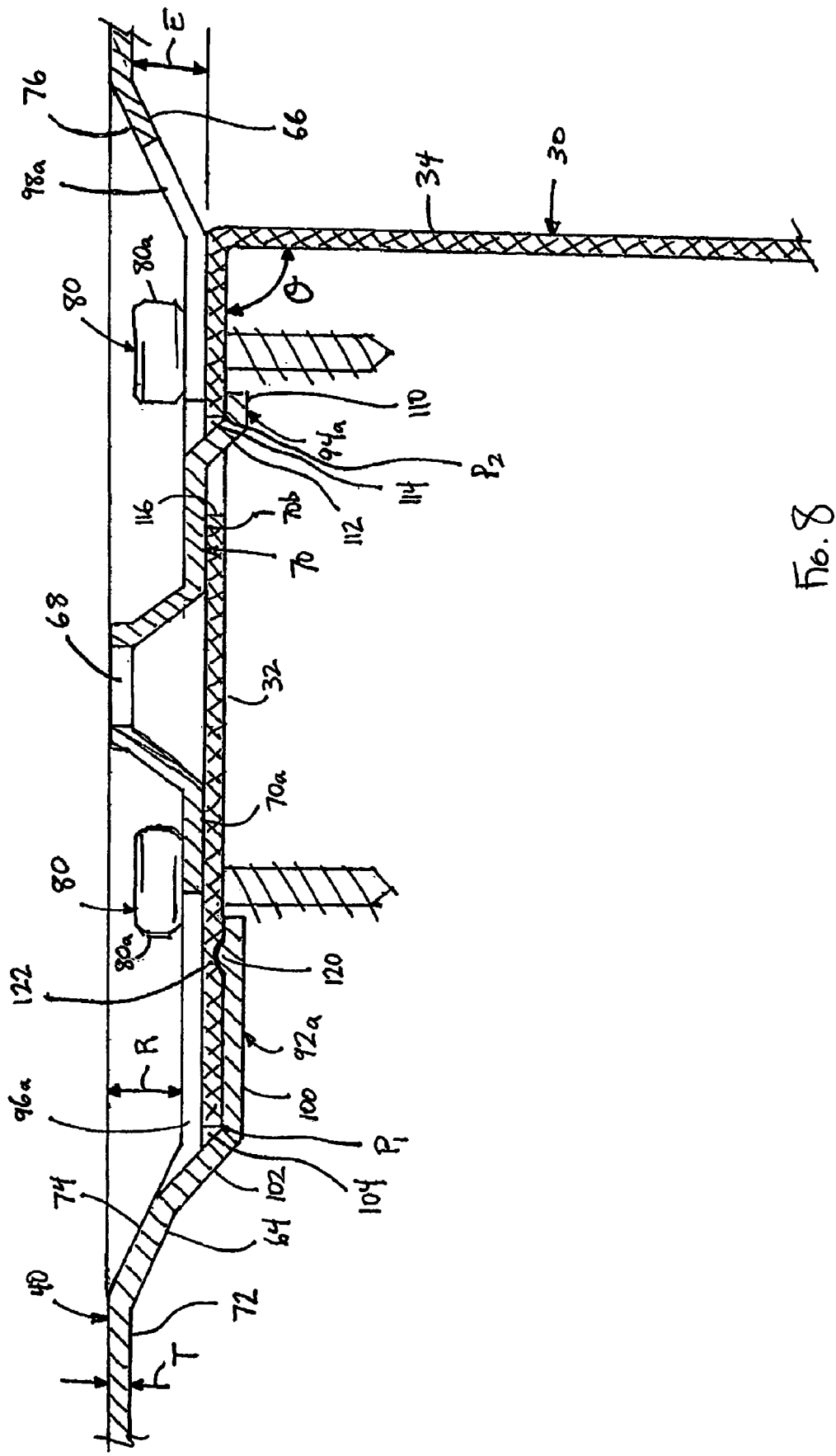
FIG. 8 is a horizontal cross-sectional view of a mounting portion of the joist rim of FIG. 5, including a clip angle. The cross-sectional view of FIG. 8 is taken along view line 8-8 of FIG. 5.

In addition, preferred embodiments of the floor system 10 are configured to facilitate positioning of the clip angles 30 at desired locations along the joist rim 12 without requiring the user of the floor system 10 to measure and layout the desired spacing and position of the clip angles 30 on the web of the joist rim 12. Preferably, the floor system 10 is configured such that the clip angles 30 are held in their desired locations on the web of the joist rim 12 and inhibit from moving out of position until such time that the clip angles 30 are further secured to the joist rim 12 by a suitable method, such as using one or more mechanical fasteners, for example In the illustrated arrangement, the clip angle 30 includes a first leg 32 and a second leg 34 extending from one another at an angle θ (FIG. 8). In the illustrated arrangement, the first leg 32 is coupled to the joist rim 12, while the second leg 34 is coupled to the joist 14. Preferably, each end of each joist 14 is connected to one of the joist rims 12 in a similar manner. As will be appreciated by one of skill in the art, the angle θ between the first leg 32 and second leg 34 of the clip angle 30 may be varied to suit the desired characteristics of the floor system 10. In the illustrated arrangement, the angle θ is approximately ninety degrees. However, other suitable angles θ may also be used to achieve a non-rectangular shape of the floor system 10.

As described previously, the illustrated floor system 10 preferably includes a plurality of joists 14 extending between a pair of joist rims 12. Desirably, the joists 14 are spaced from one another a distance D along the length of the joist rims 12. For example, in common arrangements, the distance D may be 12, 18 or 24 inches. However, the joists 14 may be spaced from one another other distances as well. Furthermore, the distance D between the joists 14 may vary along the length of the floor system 10, if desired.

Preferably, the joist rim 12 is a generally channel-shaped member having a vertical web portion 40, an upper leg, or upper flange 42 and a lower leg, or lower flange 44. The upper and lower flanges 42, 44 preferably extend from upper and lower edges of the joist rim web 40, respectively, and are perpendicular to the web 40. Preferably, each of the upper and lower flanges 42, 44 extend in the same direction from the web 40, and may be of equal or unequal lengths. The designation of upper flange and lower flange herein refers to the relative positions of the flanges 42, 44 in the illustrated arrangement. Thus, in use, the joist rim 12 may be oriented such that either flange 42, 44 is supported by the wall 20 or 22, thereby effectively functioning as the lower flange.

In one alternative arrangement, the upper flange 42 may extend a lesser distance from the web 40 than the lower flange 44, thereby permitting easier access to the end of the joist 14 adjacent the web 40 of the joist rim 12. However, it is preferred that the upper flange 42 and lower flange 44 are of the same length, as described above, so that either flange 42 or 44 may be placed on the wall 20, 22 to function as the lower flange of the joist rim 12.

Preferably, the joist rim 12 is constructed from a metal material, such as steel, and is fabricated into the desired channel shape by a suitable process, such as roll forming, for example. However, other suitable materials and fabrication methods may also be used.

With additional reference to FIG. 12, a preferred joist 14 is C-shaped in vertical cross-section and includes a vertical web portion 50, an upper leg, or upper flange 52, and a lower leg, or lower flange 54. Preferably, the upper and lower flanges 52, 54 extend in the same direction from upper and lower edges, respectively, of the web 50 and are oriented perpendicular to the web 50. Preferably, the upper flange 52 includes a lip 56, which extends in a vertically downward direction from an edge of the upper flange 52 opposite the web 50. Similarly, the lower flange 54 includes a lower lip 58, which extends in a vertically upward direction from an edge of the lower flange 54 opposite the web 50. Desirably, each lip 56, 58 is oriented generally perpendicular to its respective flange 52, 54 and parallel with the web 50.

Desirably, the joist 14 is constructed from a metal material, such as steel, and is fabricated by a suitable method, such as roll forming. However, other suitable materials and fabrication methods may also be used. For example, in one arrangement, one or more of the joists 14 may be of a traditional wood beam construction. Alternatively, one or more of the joists 14 may be constructed of an engineered wood material, a laminate material, or may be of a composite construction, including two or more different materials.

With reference to FIGS. 5-8, preferably the joist rim 12 includes a plurality of mounting portions 60. In FIG. 5, two mounting portions 60 are shown, one mounting portion 60 with the connector bracket 30 removed, and a second mounting portion 60 including the connector bracket 30. Each mounting portion 60 is configured to receive a joist connector bracket, or clip angle 30, so that a joist 14 may be connected to the joist rim 12 at each mounting portion 60, if desired. However, in any single application of the floor system 10, all of the available mounting portion 60 may not be used. Preferably, the mounting portions 60 are provided at spaced intervals along the web 40 of the joist rim 12. For example, the mounting portions 60 may be provided every 12, 18 or 24 inches along the length of the joist rim 12. Alternatively, other spacings of the mounting portions 60 may be provided. For example, to permit an advantageously large number of possible distances D (FIG. 4) between the joists 14, mounting portions 60 may be provided every 4 inches along the joist rim 12.

The illustrated mounting portion 60 includes an embossment 62 defined by a pair of embossed portions 64, 66 separated by a slot 68, which preferably extends through the web 40 of the joist rim 12. The slot 68 separating the first embossed portion 64 from the second embossed portion 66 enhances the flow of material during formation of the embossed portions 64, 66 and, as a result, reduces internal stresses within the joist rim 12. Accordingly, distortion of the joist rim 12 due to internal stresses may be reduced or eliminated.

Preferably, the slot 68 extends substantially the entire length of the embossment 62. However, the slot 68 may be shorter or longer than the vertical length of the embossment 62. In addition, a relief or aperture may be of a shape other than the elongated slot 68 of the illustrated embodiment. Preferably, the shape of the slot 68 (or other relief or aperture) is configured to complement the desired shape of the embossment 62.

The embossment 62, or the combination of the embossed portions 64, 66, create a mounting surface 70, which includes a first mounting surface 70a defined by the first embossed portion 64 and a second mounting surface 70b defined by the second embossment 66. In the illustrated embodiment, the embossed portions 64, 66, together, are generally the size and shape of the leg 32 of the clip angle 30. Thus, the mounting surface 70, desirably, is generally the same size and shape as the leg 32 of the clip angle 30. However, in other arrangements, the size and shape of the mounting surface 70 may be determined by other factors, such as stiffness considerations of the web 40, and may not be the same general size and shape as the leg 32 of the clip angle 30.

In the illustrated arrangement, the mounting surface 70 is offset in a horizontal direction from an inward facing surface 72 of the remainder of the web 40 by a distance E (FIGS. 6 and 8). In one preferred arrangement, the distance E is approximately equal to two times the thickness T of the web 40 of the joist rim 12. However, other dimensions of the offset distance E may also be used. Furthermore, preferably the mounting surface 70 is substantially parallel to the web 40. However, in other arrangements, the mounting surface 70 may be angled with respect to the web 40. In such an arrangement, the angle θ (FIG. 8) between the legs 32, 34 of the clip angle 30 may compensate for the angle between the mounting surface 70 and the web 40 such that the joists 14 remain generally perpendicular to the joist rims 12.

The embossed portions 64, 66 define a pair of recesses 74, 76, respectively, on an outwardly facing surface of the web 40 of the joist rim 12. Desirably, the recesses 74, 76 each define a depth having a dimension R. The recesses 74, 76 may be useful to accommodate fasteners used to couple the clip angle 30 to the joist rim 12, as is described in greater detail below.

The clip angle 30 may be coupled to the joist rim 12 by any suitable arrangement. In the illustrated embodiment, a plurality of fasteners, such as screws 80, are used to secure the clip angle 30 to the joist rim 12. However, other suitable structures or methods may be used to secure the clip angle 30 to the joist rim 12, such as mechanical fasteners, welding, adhesives, or mechanical deformation processes, for example. Suitable mechanical fasteners may include screws, bolts and nuts and rivets, for example. If desired, various welding or brazing techniques and methods may be used to couple the clip angle 30 to the joist rim 12. Furthermore, in some arrangements, it may be desirable to use a mechanical deformation method to secure the clip angle 30 to the joist rim 12, such as a crimping or swaging process for example. In such a mechanical deformation method, the material of the joist rim 12 and/or clip angle 30 only may be used, or a separate fastening component may be utilized in securing the clip angle 30 to the joist rim 12.

Desirably, the embossed portions 64, 66 each include a plurality of preformed fastener receiving holes 82. The holes 82 are provided in a vertical fashion along each of the embossed portions 64, 66. Desirably, the fasteners, such as screws 80, are inserted through the holes 82 from the outwardly facing surface of the web 40 and screwed through the leg 32 of the clip angle 30. As will be apparent to one of skill in the art, a fastener, such as screw 80, is not necessarily positioned in each of the holes 82. Rather, a desired number of fasteners are used for each clip angle 30 depending upon the desired structural characteristics of the floor system 10 and, specifically, of the connection between the joists 14 and joist rims 12. The actual number of fasteners used is preferably less than or equal to the number of holes 82 provided and may be referred to as the fastener "schedule."

In a preferred embodiment, the clip angle 30 includes pilot holes 84 therethrough that are arranged to correspond with the fastener holes 82 of the joist rim 12. Preferably, the pilot holes 84 are smaller than the fastener holes 82. In one arrangement, for example, the fastener holes 82 have a diameter of about 5/32 of an inch and the pilot holes 84 have a diameter of about 3/32 of an inch. Thus, in a preferred arrangement, the pilot holes 84 are about 1/16 of an inch smaller in diameter than the fastener holes 82. However, other hole sizes may also be employed.

Preferably, the screws 80 are self-tapping screws and, thus, enlarge the pilot holes 84 as they pass therethrough. In other arrangements, however, the pilot holes 84 may be omitted, or replaced with indentations, and each of the screws 80 may create their own hole through the leg 32 of the clip angle 30. In alternative arrangements, the holes 82 and/or 84 may be replaced with locater indicia, such as markings or indentations, to indicate a desired location for the screws 80 and/or provide a suitable starting point to inhibit wandering of the screw 80 along the surface of the web 40.

As illustrated in FIGS. 7 and 8, preferably, the depth R of the recesses 74, 76 is configured such that the head portion 80a of the screws 80 are disposed entirely within the recesses 74, 76. With such an arrangement, the screws 80 do not protrude beyond the plane of the outwardly facing surface of the web 40. Accordingly, the outwardly facing surface of the web 40 remains planar, which advantageously permits sheeting material covering the outwardly facing surface of the joist rim 12 to lay flat against the joist rim 12.

Preferably, the joist rim 12 additionally includes a clip angle locator arrangement 90 associated with each of the mounting portions 60. The locator arrangements 90 are configured to locate the clip angles 30 relative to the mounting portions 60 such that, when joists 14 are secured thereto, the joists 14 are spaced a desirable distance D from one another. Such an arrangement advantageously permits the clip angles 30 to be quickly and accurately positioned on the joist rim 12, without requiring the time consuming step of measuring and laying out a desired arrangement of the clip angles 30 and joists 14 on the web 40 of the joist rim 12. In a particularly preferred embodiment, the locator arrangement 90 also sufficiently secures the clip angle 30 to the mounting surface 70 to retain the clip angle 30 in the desired position until such time that the clip angle 30 is secured to the joist trim 12 in a fashion preferable for use in the floor system 10, as described above. In a presently preferred arrangement, the clip angle 30 is secured to the joist rim 12 with a plurality of screws 80.

The illustrated locator arrangement 90 includes a first pair of prongs 92a, 92b located on the first embossed portion 64 and a second set of prongs 94a, 94b located on the second embossed portion 66. The prong 92a and the prong 92b are spaced from one another in a vertical direction along the length of the embossed portion 64. The prongs 92a and 92b interrupt the fastener receiving holes 82 provided on the embossed portion 64. In the illustrated arrangement, one hole 82 is provided above the prong 96a and one hole 82 is below the prong 96b, with four holes 82 being provided between the prongs 96a and 96b. In other arrangements, all of the holes 82 may be between the prongs 96a and 96b.

In the illustrated arrangement, the prongs 92a, 92b and 94a, 94b are formed from the material of the joist rim 12 and, thus, create corresponding cut-outs 96a, 96b and 98a, 98b, respectively. However, in alternative arrangements, the prongs 92a, 92b and 94a, 94b may be constructed from material separate from the joist rim 12 and subsequently attached thereto. Furthermore, a fewer or greater number of prongs 92 or 94 may be provided. In addition, other structures suitable to hold the clip angle 30 in a desired position may also be used. For example, in one alternative arrangement, a single prong may be provided to support the clip angle 30 on the joist rim 12.

The prongs 92a, 92b and 94a, 94b are spaced from the mounting surface 70 of the embossment 62 a distance sufficient to accommodate the first leg 32 of the clip angle 30. Desirably, the prongs 92a, 92b and 94a, 94b are configured to apply a force to the first leg 32 of the clip angle 30 to hold the clip angle 30 in a desired position on the web 40 of the joist rim 12.

As described previously, desirably, the prongs 92a, 92b and 94a, 94b are formed from the material of the joist rim 12. Thus, with reference to FIG. 8, the prong 92a includes a retaining section 100, which is generally parallel to the mounting surface 70a, and a connecting section 102, which connects the retaining section 100 to the embossed portion 64 of the web 40. Preferably, the total length of the prong 92a (in the lengthwise direction of the joist rim 12) is approximately one-half of the width of the embossed portion 64 (in the same direction of the joist rim 12). In the illustrated embodiment, the retaining section 100 tapers along its length when moving away from the connecting section 102 and makes up the majority of the overall length of the prong 92a.

The prong 92a defines a slot 104 between the prong 92a and the mounting surface 70a. A portion of the leg 32 of the clip angle 30 is received within the slot 104 and, preferably, abuts a transition point $P_1$ between the retaining section 100 and the connecting section 102. The transition point $P_1$ may be configured, at least in part, to locate the clip angle 30 in a desired location relative to the joist rim 12. Thus, the transition point $P_1$ may function as a stop to position the clip angle 30 in a desired location. Although labeled as a point herein, the transition point $P_1$, in two dimensions, is theoretically a line of intersection between the retaining section 100 and the connecting section 102 of the prong 92a. However, realistically, contact between the clip angle 30 and the prong 92a will occur along a small area, rather than a line. Furthermore, although not illustrated in FIG. 8, desirably, the prong 92b is of a substantially similar construction to that of the prong 92a.

The prong 94a also includes a retaining section 110 and a connecting section 112, which connects the retaining section 110 to the embossed portion 66. Preferably, a length of the retaining section 110 of the prong 94a is substantially less than the length of the retaining section 100 of the prong 92a. However, in the illustrated arrangement, the recess 98a is substantially longer than the retaining section 110 of the prong 94a because, during fabrication, the prong 94a is initially formed substantially the same length as the prong 92a and, subsequently, an end of the retaining section 110 is removed. As a result, the recess 98a has a greater lengthwise dimension than the lengthwise dimension of the prong 94a.

Preferably, the prong 94a also defines a slot 114 with the mounting surface 70b of the embossed portion 66. A portion of the leg 32 of the clip angle 30 is received within the slot 114 of the prong 94a. However, unlike the prongs 92a and 92b, the connecting section 112 of prong 94a extends through an opening 116 defined in the leg 32 of the clip angle 30. An edge of the opening 116, preferably, contacts a transition point $P_2$ between the retaining section 110 and the connecting section 112 to locate, at least in part, the clip angle 30 relative to the web 40 of the joist rim 12, in a manner similar to the transition point $P_1$. Advantageously, the reduced lengthwise dimension of the retaining section 110 permits the prong 94a to pass through the opening 116 of the first leg 32 of the clip angle 30. Although not shown in FIG. 8, preferably, the prong 94b is constructed in a substantially similar manner to the prong 94a.

For assembly of the clip angle 30 to the mounting portion 60 of the joist rim 12, the edge of the first leg 32 opposite the second leg 34 is inserted into the opened end of the slot 104 defined by the prongs 92a and 92b. The clip angle is then pivoted toward the mounting surface 70 such that the prongs 94a, 94b pass through the respective openings 116 in the first leg 32 of the clip angle 30. The clip angle 30 may then be moved toward the closed ends of the slots 104, 114 until contact with the transition points $P_1$, $P_2$ is made.

To assist a user in positioning the clip angles 30 onto the mounting portion 60, preferably a directional indicator, such as an arrow 118 (FIG. 5) is provided on the joist rim 12 and indicates a proper direction to insert the clip angle 30 onto the mounting portion 60 and beneath the prongs 92, 94. The arrow 118 preferably is located on the web 40 of the joist rim 12 and one arrow 118 is provided for each mounting portion 60. However, more or less arrows 118 may be provided relative to the number of mounting portions 60 present. The arrow 118 may be embossed, printed, etched, cut into or otherwise marked onto the joist rim 12.

An additional benefit of the arrow(s) 118 is that they permit a user to easily orientate opposing joist rims 12 relative to one another. For example, the user may position a joist rim 12 on each one of a pair of opposing walls (such as walls 20 and 22 in FIG. 1) with the arrow(s) 118 of each joist rim 12 pointing in the same direction. When arranged as such, each of the joist rims 12 is oriented such that the mounting portions 60, and the protruding portions of the screws 80 that secure the clip angle 30 to the joist rim 12, are positioned on the same side of the joist-coupling leg 34 of the clip angle 30. Accordingly, the joists 14 may be connected to the leg 34 of the clip angle 30 on each of the opposing joist rims 12 without interfering with the screws 80 on either of the joist rims 12.

In the illustrated embodiment, the prongs 92a and 92b (not shown) include a projection 120, which projects into the slot 104 and is received by a depression 122 (FIG. 9) defined by a surface of the first leg 32 of the clip angle 30 facing the prong 92a or 92b. The projection 120 and the depression 122 function as interference surfaces to resist a force tending to remove the clip angle 30 from the slots 104, 114. Thus, the cooperation of the projection 120 and depression 122 advantageously inhibits removal of the clip angle 30 from the desired position within the slots 104, 114 until such time that the fasteners, such as screws 80, may be used to further secure the clip angle 30 to the joist rim 12, as described previously. Alternatively, the prongs 92a and 92b may be provided with a depression and the clip angle 30 provided with a projection. Furthermore, other structures to create interference surfaces between the prongs 92a and 92b and clip angle 30, or other arrangements suitable to inhibit undesired movement of the clip angle 30, may also be used.

In the illustrated embodiment, the transition points $P_1$ and $P_2$, along with the projection 120 of the joist rim 12, contact a surface of the clip angle 30 to locate the clip angle 30 in a desired position relative to the joist rim 12. Thus, advantageously, the need to measure and layout a desired location of the clip angles 30 on the joist rim 12 is eliminated. In alternative arrangements, however, it is not necessary that each of the transition point $P_1$, transition point $P_2$ and the projection 120 provide a location function for the clip angle 30. For example, any single one, or any combination, of the transition point $P_1$, transition point $P_2$ and the projection 120 may function to locate the clip angle 30. Alternatively, other suitable structures may be provided to locate, or assist in locating, the clip angles 30 in a manner similar to those described above.

In one alternative arrangement, projections 120 may be provided on either or both of the web 40 or legs 42, 44 of the joist rim 12 to locate or assist in locating the clip angle 30 or the joist 14 relative to the joist rim 12. For example, a pair of projections 120 may be spaced lengthwise along the joist rim 12 from one another a distance approximately equal to a width of the joist 14 to receive the joist 14 therebetween. With the joist 14 located relative to the joist rim 12, a clip angle 30 may be used to secure the joist 14 to the joist rim 12. As will be appreciated by one of skill in the art, the projections 120 may take on a variety of different shapes. Further, in such an arrangement, the clip angle 30 may include one or more recesses or cutout portions to accommodate the projections 120 and permit the clip angle 30 to be moved along the joist rim 12 into position next to the joist 14 without interfering with the projections 120.

In the illustrated arrangement, preferably, the second leg 34 of the clip angle 30 includes a plurality of preformed fastener receiving holes 124 configured to receive a fastener, such as a screw, in each of the holes 124 in order to secure an end of a joist 14 to the joist rim 12. However, in alternative arrangements, the preformed holes 124 may be replaced with fastener location indicia, which illustrate a preferred location of the fasteners, such as screws 126 (FIG. 4), but do not extend completely through the leg 32 of the clip angle 30.

Preferably, both the upper flange 42 and the lower flange 44 of the joist rim 12 include fastener locator indicia 130, which are configured to indicate a desired location for the application of a fastener, such as a screw (not shown). The locator indicia 130 preferably include two types of indicators, an outward facing indicator 132, which faces away from the web 40 of the joist rim 12, and an inward facing indicator 134, which faces toward the web 40 of the joist rim 12. Desirably, both indicators 132, 134 repeat in a pattern along the length of the joist rim 12. In one arrangement, the outward facing indicators 132 repeat every 12 inches along the length of the joist rim 12. Accordingly, the outward facing indicators 132 are configured to be in alignment with either the upper or lower flanges 52, 54 of a joist 14 that is connected to a mounting location 60 associated with the outward facing indicator 132.

In the illustrated arrangement, the inward facing indicators 134 are spaced every four inches along the length of the joist rim 12. The inward facing indicators 134 provide suitable locations for a fastener, such as a screw, to be introduced to secure the joist rim 12 to a supporting structure, such as the first wall 20 or second wall 22 (FIG. 1). However, other suitable spacing of the inward facing indicators 134 may also be used. Furthermore, other arrangements or types of the fastener indicators may also be provided to suit the needs of the individual floor system 10.

Preferably, the locator indicia 130 of the upper flange 42 and the lower flange 44 are a mirror image of one another. Accordingly, the indicators 132, 134 appear consistent to a user of the joist rim 12 regardless of whether the upper flange 42 or lower flange 44 is located at the upper end of the web 40. That is, the joist rim 12 may be rotated about its longitudinal axis without affecting the appearance or usefulness of the locators 132, 134.

In the illustrated arrangement, the indicators 132, 134 are indentations in the surface of the flanges 42, 44, which indicate a desired location for a screw and, preferably, inhibit wandering of the screw on the surface of the flanges 42, 44. However, other suitable indicator arrangements may also be used. For example, the indicators 132, 134 may be etched or otherwise printed on the flanges 42, 44, without creating a significant indentation. Conversely, the indicators 132, 134 may be preformed screw holes. In addition, other suitable indicator arrangements apparent to one of skill in the art may also be used.

With reference to FIGS. 10-12, a preferred joist 14 is illustrated separately from the floor system 10. Desirably, the joist 14 includes a pair of circular openings, or apertures 140, near a center of the joist 14. The apertures 140 may be utilized to pass utility elements, such as wiring, pipes, ducts, or the like therethrough. However, in some arrangements, the apertures 140 may be omitted.

In addition, preferably, the joist 14 includes one or more larger openings, or apertures 142, located along the length of the joist 14. In the illustrated arrangement, an aperture 142 is located at approximately one-thirds and at approximately two-thirds of the length of the joist 14. The apertures 142 preferably are generally trapezoidal in shape with the shorter side of the trapezoid being positioned near the upper flange 52 of the joist 14, or above the longer side of the trapezoid. Desirably, the corners of the trapezoidal shape are rounded. Preferably, the aperture 142 includes a rim 144 about its periphery and extending in the same direction from the web 50 as the flanges 52, 54. The rim 144 provides additional strength to the web 50 in the area around the aperture 142.

Preferably, one or more embossments, generally referred to by the reference numeral 146, are provided proximate the aperture 142. In the illustrated arrangement, four embossments 146a-146d are provided and arranged at generally the corners of the generally trapezoidal aperture 142. In the illustrated arrangement, the embossments 146a-146d are also trapezoidal in shape. The upper embossments 146a, 146b have the larger side of the trapezoidal shape above the shorter side of the trapezoidal shape. Conversely, the lower embossments 146c, 146d have the shorter side of the trapezoidal shape above the longer side of the trapezoidal shape.

The embossments 146a-146d add strength to the web 50 in the area proximate the aperture 142 and may be used in addition to, or in lieu of, the rim 144 of the aperture 142. Accordingly, the aperture 142 may be relatively large, and occupy a substantial portion of the height of the web 50 to permit larger utility objects, such as duct work and the like, to pass therethrough. Desirably, as with the embossments 62 of the joist rim 12, the embossments 146a-146d have a depth of about two times the thickness of the material of the joist 14. However, the depth of the embossments 146a-146d may be altered to achieve the desired structural characteristics of the joist 14.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present floor system has been described in the context of a particularly preferred embodiment, the skilled artisan will appreciate, in view of the present disclosure, that certain advantages, features and aspects of the system may be realized in a variety of other applications, many of which have been noted above. Additionally, it is contemplated that various aspects and features of the invention described can be practiced separately, combined together, or substituted for one another, and that a variety of combination and sub-combinations of the features and aspects can be made and still fall within the scope of the invention. Thus, it is intended that the scope of the present invention herein disclosed should not be limited by the particular disclosed embodiments described above, but should be determined only a fair reading of the claims.

What is claimed is:

1. A joist rim assembly, comprising:
   a web;
   a first prong and a second prong, each defining a slot with said web;
   a plurality of preformed fastener holes formed in the web;
   a joist connector bracket having a first portion, and a second portion, said second portion of said joist connector bracket capable of supporting a joist; and
   a plurality of fasteners, wherein each one of said plurality of fasteners passes through one of said plurality of preformed fastener holes and through said first portion of said joist connector bracket to secure said joist connector bracket to said web;
   wherein said plurality of preformed fastener holes are located relative to said prong such that a fastener passed through any of said plurality of preformed fastener holes will also pass through the joist connector bracket received within said slot;
   wherein said first prong overlaps an edge of said first portion of said connector bracket, and said second prong extends through an opening in said first portion of said joist connector bracket and overlaps an edge of said first portion adjacent said opening.

2. The joist rim of claim 1, additionally comprising a first flange extending from a first edge of said web and a second flange extending from a second edge of said web.

3. The joist rim of claim 2, wherein said first flange comprises a first fastener locator indicia on a first side of said first flange and a second fastener locator indicia on a second side of said first flange, and said second flange comprises a first fastener locator indicia on a first side of said second flange and a second fastener locator indicia on a second side of said second flange.

4. A joist rim assembly, comprising:
   a joist connector bracket;
   a joist rim comprising a web extending along a length of said joist rim;
   a first prong extending from said web and including a retaining section and a connecting section, said retaining section being spaced from said web a distance sufficient to accommodate a portion of said joist connector bracket therebetween, said connecting section of said prong connecting said retaining section to said web;
   a second prong extending from said web through an opening in said joist connector bracket and overlapping a portion of said joist connector bracket;
   a first stop configured to contact and locate said joist connector bracket at a desired position along said length of said joist rim;
   a second stop configured to contact and locate said joist connector bracket at a desired vertical position of said web; and
   at least one fastener that secures said joist connector bracket to said web in a position such that said joist connector bracket contacts both said first stop and said second stop and is held in said position by said at least one fastener.

5. The joist rim of claim 4, additionally comprising a plurality of fastener locator indicia on said web to facilitate coupling of said joist connector bracket to said joist rim.

6. The joist rim of claim 4, additionally comprising a first flange extending from a first edge of said web and a second flange extending from a second edge of said web.

7. The joist rim of claim 5, wherein said fastener locator indicia comprise a preformed fastener hole.

8. The joist rim of claim 4, wherein said second stop is defined by said second prong.

9. The joist rim of claim 4, wherein a pair of first prongs and a pair of second prongs are configured to secure a single joist connector bracket to said web.

10. A joist rim assembly, comprising:
    a web;
    a first prong defining a first slot with said web;
    a second prong defining a second slot with said web, said second prong spaced in a vertical direction along said web from said first prong, said first prong and said second prong extending in the same direction along a length of said web;
    a third prong defining a third slot with said web, said third prong spaced in a horizontal direction along said web from said first prong;
    a fourth prong defining a fourth slot with said web, said fourth prong spaced in a horizontal direction along said web from said second prong;
    a plurality of preformed fastener holes formed in the web, at least a portion of said plurality of preformed fastener holes located between said first prong and said second prong in said vertical direction along said web;
    a joist connector bracket received within said first, second, third, and fourth slots, said first, second, third, and fourth prongs configured to hold said joist connector bracket within said first, second, third, and fourth slots at a desired position relative to said web when said web is oriented in a vertical plane, a second portion of said joist connector bracket capable of supporting a joist; and
    a plurality of fasteners, wherein each one of said plurality of fasteners is passed through one of said plurality of preformed fastener holes and through said first portion of said joist connector bracket to secure said joist connector bracket to said web;
    wherein said third and fourth prongs each extend through an opening in said joist connector bracket.

11. A joist rim assembly, comprising:
    a joist connector bracket;
    a web;
    a first prong defining a first slot with said web, said first prong configured to overlap an edge of said joist connector bracket when said joist connector bracket is received within said first slot; and
    a second prong defining a second slot with said web, said second prong configured to extend through an opening in said joist connector bracket when said joist connector bracket is received within said second slot.

12. The joist rim of claim 11, additionally comprising a plurality of fastener locator indicia on said web to facilitate coupling of said joist connector bracket to said joist rim.

13. The joist rim of claim 12, wherein said fastener locator indicia comprise a preformed fastener hole.

14. The joist rim of claim 11, additionally comprising a first flange extending from a first edge of said web and a second flange extending from a second edge of said web.

* * * * *